(12) United States Patent
Valdivia et al.

(10) Patent No.: US 6,174,410 B1
(45) Date of Patent: *Jan. 16, 2001

(54) PROCESS APPARATUS FOR RECOVERING RAW MATERIALS FROM PAPER MILL EFFLUENTS

(75) Inventors: Juan Valdivia, Bad Wildungen; Wolfgang Braun; Dieter Trutschler, both of Essen, all of (DE)

(73) Assignee: Julia Innotec GmbH

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/894,090
(22) PCT Filed: Feb. 9, 1996
(86) PCT No.: PCT/EP96/00566
  § 371 Date: Oct. 22, 1997
  § 102(e) Date: Oct. 22, 1997
(87) PCT Pub. No.: WO96/25551
  PCT Pub. Date: Aug. 22, 1996

(30) Foreign Application Priority Data

Feb. 14, 1995 (DE) ............................ 195 04 717
Jun. 3, 1995 (DE) ............................ 195 20 494

(51) Int. Cl.⁷ ............................ D21D 5/02; D21F 1/66
(52) U.S. Cl. ............................ 162/55; 162/189; 162/190; 162/DIG. 9; 210/800; 210/806; 210/928
(58) Field of Search ............................ 162/189, 190, 162/191, DIG. 9, 550; 210/712, 787, 806, 928, 799, 800; 209/273, 274, 281

(56) References Cited

U.S. PATENT DOCUMENTS

| | | | |
|---|---|---|---|
| 3,833,468 | * | 9/1974 | Boniface ........................ 162/264 |
| 4,332,638 | * | 6/1982 | Mauer et al. ...................... 162/4 |
| 4,849,096 | * | 7/1989 | Konig ............................ 209/211 |
| 4,983,258 | | 1/1991 | Maxham ........................ 162/189 |
| 5,112,444 | * | 5/1992 | Henricson et al. .............. 162/55 |
| 5,137,599 | * | 8/1992 | Maxham .......................... 162/5 |
| 5,423,993 | * | 6/1995 | Boney, Jr. ...................... 210/787 |

FOREIGN PATENT DOCUMENTS 40 34 054  4/1992  (DE).
43 34 283  4/1995  (DE).
WO 95/04189 * 2/1995  (WO).

* cited by examiner

Primary Examiner—Dean T. Nguyen
(74) Attorney, Agent, or Firm—Nixon Peabody LLP; David S. Safran

(57) ABSTRACT

This invention relates to a process for recovering raw materials from a stream of residual or collected material (R) which comprises a plurality of different materials and which arises during the manufacture of paper (P) in a paper mill (1) and/or in a material processing installation (2) and/or in a paper machine (3) and which is discharged therefrom, wherein the stream of residual or collected material (R) is fed to an installation (4) for separating at least one fiber fraction contained in the stream of residual or collected material (R) via a screening operation and for separating an ash fraction (A) comprising black particles. In order to achieve cost-effective recovery of the raw materials, it is specified according to the invention firstly that the separation of the fiber fraction via screening is effected, in accordance with the process, before the separation of the ash fraction (A) containing black particles, and secondly that the paper fraction is classified, depending on the desired paper size, into at least two different classes of fiber, preferably into long fibers (LF), short fibers (KF) and/or broken fibers (BF), by a screening operation in each case.

10 Claims, 1 Drawing Sheet

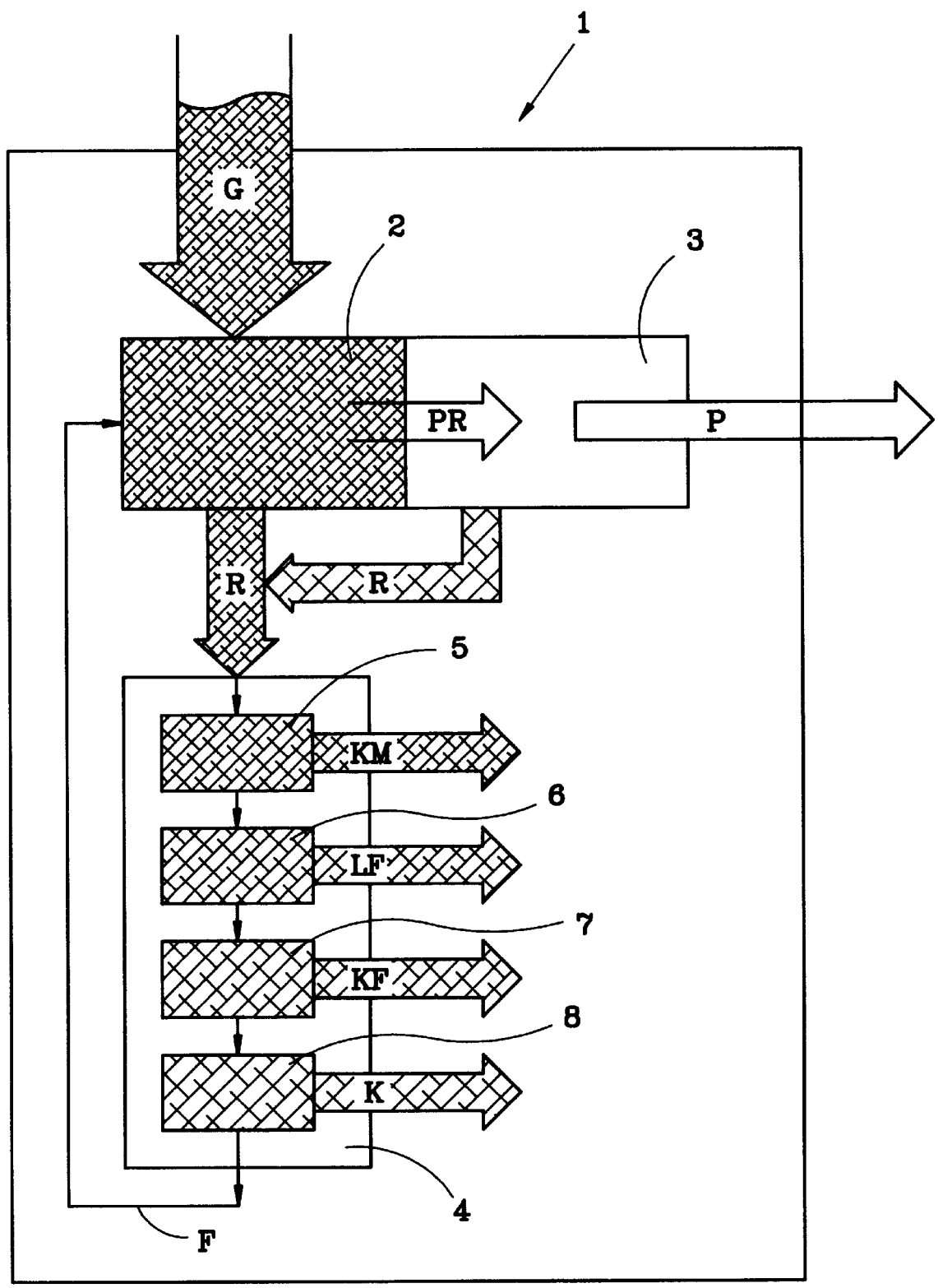

PROCESS APPARATUS FOR RECOVERING RAW MATERIALS FROM PAPER MILL EFFLUENTS

BACKGROUND OF THE INVENTION

This invention relates to a process and installation for recovering raw materials from a stream of residual or collected material which includes a plurality of different materials and which results from the manufacture of paper in a paper mill, from a material processing installation and/or a paper machine. In particular, to a process for recovering raw materials from a stream of residual or collected material via a screening operation and for separating an ash fraction containing black particles.

The manufacture of paper mill is a paper mill is usually effected in a manner such that a paper raw material suitable for the paper manufacture concerned is produced from fresh or waster paper fibers or from a mixture of said fibers in a material processing installation of the paper mill, which material processing installation is disposed upstream of the paper machine. Depending on the quality of the final product, this paper raw material consists of a mixture of fibers of very different qualities. Residual or collected material arises in the process water stream, both in the material processing installation during the material processing stage, and in the paper machine. Amongst other constituents, this residual or collected material contains coarse contaminants such as plastics and metal parts, fibrous material, black particles such as soot and printing ink residues, and contains fillers comprising a large proportion of kaolin, pigments, calcium carbonate and titanium dioxide. The process water stream which contains the residual or collected material snad which is discharged by the paper mill, and which is hereinafter termed the stream of residual or collected material, has hitherto usually been fed to a water treatment stage. The filtrate thereby obtained was then recycled to the paper mill, whilst the sludge removed from the water treatment stage had to be disposed of. The present invention is exclusively concerned with the stream of residual or collected material discharged from the paper mill.

In the process which is known from German Patent DE 40 34 054 C1, the entire residual or collected material is fed as a waste water stream to a residual waste water clarification installation and is subjected to a sedimentation operation, optionally with the assistance of flocculants. A thin sludge is then taken off from the sludge collecting compartment of the clarification installation. Residual waster water is admixed with the thin sludge in order to obtain an accurately determined consistency. The coarse contaminants contained in the stream of residual or collected material are subsequently removed by screening. The screened throughput stream is fed to a centrifuging installation having a plurality of hydrocyclones for separating black particles. The material stream which is discharged from the hydrocyclones is then fed to a screening stage in which fractions comprising fibers and agglomerates, as well as pigments and fillers, are produced. The pigments and fillers are separated from each other in a subsequent process stage. Finally, the fibers, pigments and fillers are recycled to the material processing stage of the paper mill.

Thus known process has various significant disadvantages. The clarification installation and the centrifuging installation with is hydrocyclones are very expensive and cost-intensive. Moreover, the energy requirement for operating the clarification installation, and particularly for operating the centrifuging installation, is very high, since there is a comparatively high pressure drop in the hydrocyclones during operation. Furthermore, the accurate adjustment of the thin sludge stream fed to the hydrocyclones is firstly expensive and secondly essential, since if the thin sludge concentration departs from the optimum consistency the hydrocyclones can no longer be operated or can only be operated at low efficiency. This known installation is explicitly designed for use in the wood pulp processing industry, since the fibers obtained from the waste water sludge are essentially pulp fibers. This known installation is not designed for use in an industry which also processes waste paper, where the fibre fraction obtained from the residual or collected material contains very many short and broken fibers, which makes the use of this fibre fraction very difficult and makes it impossible for most paper mills.

SUMMARY OF THE INVENTION

With the present invention, it has firstly been recognized for the first time that the black particles in part only adhere to the fibers and to the coarse contaminants with forces of adhesion which are very weak. During the separation of the fibre fraction, the black particles can in part be separated very easily from the coarse contaminant and from the fibers, due to the turbulence effects which occur, and by means of the screening operation. It is therefore not necessary to separate the black particles as a whole in an expensive manner beforehand. Separation of the black particles when the fibers are screened even results in part in a higher degree of whiteness than that achieved by centrifuging. The costly plant engineering of the prior art for the preliminary separation of the black particles is not necessary with the present invention.

It has also been recognized according to the invention that the fibre fraction can be utilized without difficulty in a particularly economic manner, even if it contains large proportions of short and broken fibers, if the fibre fraction is classified via corresponding screens, depending on the desired fibre size, into different classes of fibre, for example into long fibers, short fibers and/or broken fibers. This gives rise to the possibility, even in the waste fibre processing industry, of recycling the recovered fibers to the production operation in a manner which is quite specific, depending on the demands imposed on the product to be produced. The grades or classes of fibers which cannot be used by the paper mill concerned can be supplied, i.e. sold, to other paper mills for the manufacture of grades of paper where the final product is subject to different requirements, or to other branches of industry.

A significant process simplification is achieved if the stream of residual or collected material discharged from the material processing installation and/or from the paper machines is fed directly or immediately to the installation—i.e. without the interposition of a clarification or water treatment installation—and in particular without pre-adjustment of the consistency. Moreover, only relatively simple plant engineering is required.

Furthermore, the process provides the possibility of first separating, by a screening operation, a coarse contaminant fraction which contains plastics and/or metals, for example, from the stream of residual or collected material before the classification of the fibre fraction. The fibre fraction is subsequently classified into the desired classes of fibre. Finally, separation of the ash fraction can also be effected via a screening operation. Due to the use of the screening technique, at least for separating or classifying the coarse contaminants ans the classes of fibre, it is possible, if the corresponding screens are arranged in cascade, to effect separation or classification and thus to effect the recovery of very different classes of fibre, substantially under the action of the force of gravity. The requisite energy consumption for producing the various grades of fibre is thus restricted to a minimum.

Moreover, the thorough treatment of the stream of residual or collected material results in a filtrate of sufficiently high quality so that a further water treatment stage is unnecessary. The filtrate, the quality of which can be adjusted corresponding to the requirements, can be recycled directly to the material processing installation, and/or to the paper machine, and/or to the stream of residual or collected material upstream of and/or in the installation, or to the waste water.

BRIEF DESCRIPTION OF THE DRAWINGS

The sole FIGURE is a schematic illustration of a paper mill.

DETAILED DESCRIPTION OF THE PREFERRED EMBODIMENTS

The paper mill 1 has an existing material processing installation 2 and a paper machine 3. It is quite essential according to the invention that an installation 4 which is disposed directly or immediately downstream is associated with the paper mill 1 and with the paper machine 3 also. Treatment of a stream of residual or collected material R which is discharged from the material processing installation 2 and the paper manufacturing installation 3 is effected in this installation 4, and different materials contained in the stream of residual or collected material R are thereby separated and are at least in part recovered.

The installation 4 comprises three available separation or classification stages 5, 6, 7, 8, 9, through which the stream of residual or collected material R is passed in succession. It should be understood that a larger or small number of separation or classification stages is also possible. The number of separation or classification stages depends on the particular situation, and is oriented firstly towards the desired products to be produced and secondly towards the desired grades or classes of these products. Screens, particularly vibrating screens, are presently used in each of the separation or classification stages 5 to 8. The mesh aperture of the respective screen or screens in separation stage 5 is about 1 to 2 mm. The mesh aperture of the respective screen or screens in classification stage 6 is between 0.5 and 0.3 mm, and is between 0.1 mm and 0.3 mm in classification stage 7 and between 0.04 and 0.1 mm in classification stage 8. If at least one screen is also used in separation stage 9, the smallest mesh aperture here is about 10 $\mu$m. However, flotation, sedimentation and/or filtration may also be effected in separation stage 9, instead of separation using a very fine screen.

The process according to the invention proceeds as follows:

A paper raw material feedstock G is fed to the material processing installation 2 of the paper mill 1. This raw material comprises waste paper, cellulose and optionally other materials. According to the requirements imposed on the respective paper to be manufactured, the paper raw material feedstock G is split in the material processing installation 2 into a paper raw material PR and into the stream of residual or collected material R which is to be discharged. The paper raw material PR is fed to the paper machine 3 and is processed there to form paper P, which then leaves the paper mill 1 as a product, as indicated in the drawing. The stream of residual or collected material R leaves the material processing installation 2 and is fed to the installation 4. A stream of residual or collected material R also presently arises in the paper machine 3, and is fed to the installation 4.

At this point, it should be mentioned that in fact it is particularly advantageous if the entire stream of residual or collected material R is fed to the installation 4 following material processing/paper manufacture. However, it should of course be understood that any partial streams or partial amounts of the stream of residual or collected material R which may arise, which have not yet been subjected to the entire material processing/paper manufacturing process but which contain a plurality of different materials, can also be fed directly to the installation 4. However, the arrangement illustrated has proved to the most advantageous, wherein following the material processing installation 2 and the paper machine 3 the stream of residual or collected material R is not fed to a physicochemical clarification or waste water treatment installation as in the prior art, but is fed directly to the installation 4. With regard to clarification, it should be mentioned that it is of course possible for a clarification installation to be disposed upstream of the installation 4, which clarification installation does not perform its actual function or which only performs it to an insufficient extent, and which is thus operated semi-ineffectively or substantially ineffectively. The scope of protection of the claims also of course covers embodiments such as these.

In the embodiment illustrated, a considerable amount of process water is necessary for the manufacture of paper. The paper manufacturing process is therefore carried out "wet". Accordingly, the stream of residual or collected material R is also carried along in the process water discharged from the material processing installation 2, and a wet separation or classification is effected in the installation 4. According to the respective requirements, the separation of thin matter, medium matter or thick matter can be effected in the installation 4; this can also be described as separation in the low-, medium or high consistency range. When treatment is effected in the low consistency range the content of material in the process water is between 0 and 1%. In the medium consistency range it is between 1 and 6%, and in the high consistency range it is between 6 and 18%. Tests have shown that it is particularly advantageous for the classification of the fibers and/or the separation of the ash and for the removal of black particles if the treatment is carried out in the low consistency range, since an easier separation of the individual classes is thereby possible.

In wet separation, the individual stages 5, 6, 7, 8 are disposed in succession in cascade. The stream of residual or collected material R is first fed to the first separation stage 5, wherein plastics K and metals M are removed by screening, as are other contaminants such as sand grains, splinters and the like. Long fibers LF are screened out in the following, second classification stage 6, short fibers KF are screened out in the third classification stage 7, and broken fibers BF are screened out in the fourth classification stage 8. The mesh apertures of the corresponding screens of the individual classification stages 6, 7, 8 were given above.

Finally, the ash A is separated in the fifth separation stage 9. The ash contains black particles such as soot and printing ink residues, and also contains fillers with a large content of kaolin, as well as pigments, and may additionally contain other materials such as calcium carbonate and titanium dioxide. The ash A can be separated into some or all of said materials in the fifth stage 9 or following the latter. The filtrate F leaving the fifth stage 9 is recycled directly to the material processing installation 2. The filtrate stream may optionally, at least in part, be employed for adjusting the concentration of the stream of residual or collected material R to the desired value (thin matter) when this is fed to the installation 4, or may be fed to the paper machine.

It is possible, completely irrespective of the maimer in which the wet separation proceeds in the separation or classification stages 5, 6, 7, 8, to effect further treatment of the products obtained during separation. Thus, for example, the coarse contaminant fraction KM which comprises plastics and metals and which is discharged or obtained from separation stage 5 can be subjected again to a separation into plastics on the one hand and metals on the other hand, or can be disposed of directly. The long fibers LF, short fibers KF and broken fibers BF obtained in classification stages 6, 7 and 8 can be thickened using a press and/or dried, for example. These individual classes of fiber can subsequently be recycled as part of the paper raw material feedstock G to the material processing installation 2, or can be supplied for another industrial use. The screened material comprising the ash A, which is obtained in the fifth separation stage 9, is preferably separated into the aforementioned constituents, this can be effected via flotation, screening, sedimentation, filtration and/or by centrifuging.

It should be understood that the treatment of the stream of residual or collected material R in the installation 4 does not necessarily have to be a wet treatment. A dry separation operation is also possible, of course. This is particularly advantageous if the stream of residual or collected material R comes from the material processing installation and/or from the paper machine in a dry state, which means that material processing and/or paper manufacture are themselves carried out in a dry state. It is also possible, of course, to dry the stream of residual or collected material R before it is fed to the installation 4, whereby it is therefore separated from the process water coming from the material processing installation or from the paper machine and is subjected to separation as an airborne stream of residual or collected material R.

In order to be able to effect dry separation in the installation 4, it is necessary that the stream of residual or collected material R be pulverized. This can be accomplished in an appropriate mill, for example. The pulverized stream of residual or collected material R is subsequently classified, whereupon the aforementioned separate materials and classes of material are obtained. Classification may be effected, for example, via air classifiers, by centrifuging, or by cyclones, screens or the like. Since the separation is carried out dry, it should be understood that the materials KM or the classes of fiber LF, KF and BF do not necessarily require subsequent treatment. A flotation treatment and/or another form of treatment may be employed simply for fraction A.

What is claimed is:

1. A process for recovering raw materials from a stream of residual or collected material composed of a plurality of different materials having a consistency in water from above 0 up to 6% by weight and which results from the manufacture of paper and are discharged from at least one of a paper mill, a paper material processing installation and a paper machine, comprising the steps of directly feeding the stream of residual or collected material discharged from said at least one of the paper mill, the paper material processing installation and the paper machine to a separating installation for separating out at least one fiber fraction contained in the stream of residual or collected material without modification of the consistency of the stream;

separating the fiber fraction from the stream of residual or collected material by vibratory screening thereof; and separating an ash fraction containing black particles from the stream of residual or collected material by vibratory screening thereof after the step of separating the fiber fraction has been effected;

wherein the step of separating the fiber fraction comprises a plurality of vibratory screening operations using screens of different types by which the fiber fraction is separated, depending on desired fiber size, into at least two different classes of fiber which are independently reusable, and wherein the screening operations comprise gravity action cascade screening operations using the effect of the force of gravity.

2. A process according to claim 1, further comprising the step of separating a coarse contaminant fraction, which contains at least one of plastics and metals form the stream of residual or collected material prior to said step of separating the fiber fraction.

3. A process according to claim 2, wherein the step of separating the fiber fraction comprises a plurality of screening operations by which the fiber fraction is separated, depending on desired fiber size, into at least two different classes of fiber; and further comprising the step of thickening and drying at least one of the classes of fibers obtained by said screening operations.

4. A process according to claim 3, wherein the step of separating a coarse contaminant fraction comprises a screening operation.

5. A process according to claim 3, wherein the screening operations comprise gravity action cascade screening operations.

6. A process according to claim 1, wherein said feeding step comprises the step of feeding, the stream of residual or collected material to the separating installation in a wet state containing up to 1% by weight water.

7. A process according to claim 1, comprising the further step of feeding a resulting filtrate to the stream of residual or collected material in or upstream of said at least one of the paper mill, material processing installation, and the paper machine.

8. A recovery installation for recovering raw materials from a stream of residual or collected material which comprises a plurality of different materials having a consistency in water from above 0 up to 6% by weight and which arises during the manufacture of paper in at least one of a paper mill, a paper material processing installation and a paper machine, wherein the recovery installation comprises:

at least one fiber screening separation stage; and at least one ash separation stage for separating an ash fraction containing black particles;

wherein the at least one ash separation stage is disposed downstream of the fiber screening separation stage; and wherein the recovery installation is directly connected to downstream of the at least one of the paper mill, paper material processing installation and paper machine downstream thereof: and wherein the at least one fiber screening separation stage comprises at least two fiber screening classification stages, each of which has a vibratory screen of a different type which separates a particular fiber fraction, depending on desired fiber size, into at least two different classes of fiber which are independently reusable; and at least one vibratory screening separation stage which separates out coarse nonfibrous materials; and wherein each vibratory screen and the vibratory screening separation stage comprise a gravity action cascade screen using the effect of the force of gravity.

9. An installation according to claim 8, wherein an ash separation stage is disposed downstream of the fiber screening separation stage.

10. A paper mill having a material processing installation and a paper machine, means for feeding a paper raw material feedstock to the material processing installation, and means for splitting the paper raw material feedstock in the material processing installation into a paper raw material which is fed into the paper machine and into a stream of residual or collected material having a consistency in water from above 0 up to 6% by weight which is discharged from at least one of the material processing installation and the paper machine, and having a recovery installation for recovering raw materials from the stream of residual or collected material, said recovery installation being positioned directly downstream of at least one of the material processing installation and the paper machine; wherein the recovery installation comprises at least one vibratory fiber screening separation stage which has vibratory screens of different types which separate particular fiber fractions, depending on desired fiber size, into at least two different classes of fiber which are independently reusable; and at least one vibratory screening separation stage which separates out coarse nonfibrous materials; wherein the vibratory screens and the vibratory screening separation stage comprise gravity action cascade screens using the effect of the force of gravity.

* * * * *